US006081364A

United States Patent [19]
Kimura

[11] Patent Number: 6,081,364
[45] Date of Patent: Jun. 27, 2000

[54] LASER LIGHT SOURCE FOR EMITTING A PLURALITY OF LASER BEAMS, METHOD ADJUSTING FOCUSING OF THE LASER LIGHT SOURCE, AND SCANNING OPTICAL SYSTEM

[75] Inventor: Kazumi Kimura, Toda, Japan

[73] Assignee: Canon Kabushiki Kaisha, Tokyo, Japan

[21] Appl. No.: 09/135,647

[22] Filed: Aug. 18, 1998

[30] Foreign Application Priority Data

Aug. 22, 1997 [JP] Japan .................................... 9-241761

[51] Int. Cl.[7] .................................................... G02B 26/08
[52] U.S. Cl. .......................... 359/204; 359/212; 359/216; 347/243
[58] Field of Search ...................................... 359/196, 204, 359/209–211, 212–219; 347/225, 232, 233, 238–245

[56] References Cited

U.S. PATENT DOCUMENTS

5,170,278 12/1992 Wada et al. .............................. 359/212
5,774,248 6/1998 Komatsu .................................. 359/204
5,808,774 9/1998 Kawabata ................................ 359/210

*Primary Examiner*—James Phan
*Attorney, Agent, or Firm*—Fitzpatrick, Cella, Harper & Scinto

[57] ABSTRACT

The laser light source includes a laser light emitting device for emitting a plurality of laser light beams, a condenser lens for condensing the laser light beams, an interval adjusting unit for adjusting the interval between the laser light emitting device and the condenser lens, and a rotary adjustment unit for adjusting the laser light emitting device around a rotary axis perpendicular to the optical axis of the condenser lens. The rotary axis is positioned near light emission points of the laser light emitting device.

12 Claims, 5 Drawing Sheets

FIG. 12 ic_ref id="N" /># LASER LIGHT SOURCE FOR EMITTING A PLURALITY OF LASER BEAMS, METHOD ADJUSTING FOCUSING OF THE LASER LIGHT SOURCE, AND SCANNING OPTICAL SYSTEM

BACKGROUND OF THE INVENTION

1. Field of the Invention

The present invention relates to a laser light source for emitting a plurality of laser light beams, a method for adjusting the focusing of the laser light source, and a scanning optical system.

2. Related Background Art

Figure 1:
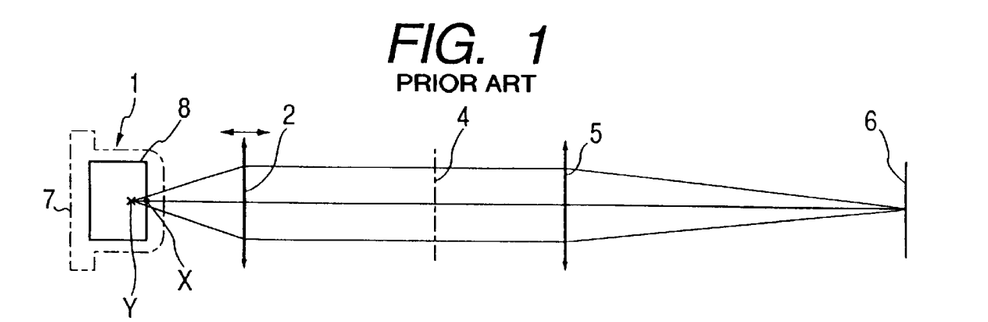
FIG. 1 is a view illustrating the structure in a main scan direction of a conventional laser scanning optical system.
Figure 2:
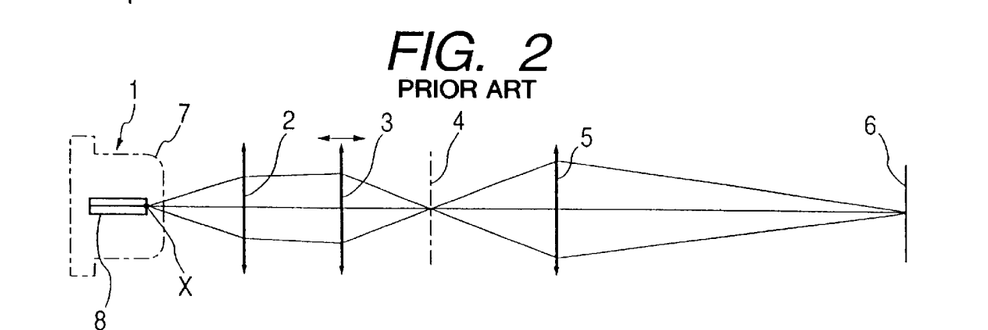
FIG. 2 is a view illustrating the structure in an auxiliary scan direction of the conventional laser scanning optical system.

FIG. 1 illustrates the cross-sectional structure of a conventional laser scanning optical system taken along a meridional cross section in a main scan direction, and FIG. 2 the cross-sectional structure thereof taken along a sagittal cross section in an auxiliary scanning direction. In the laser scanning optical system, a semiconductor laser light emitting device 1, a collimator lens 2, a cylindrical lens 3, a polygonal mirror or a deflector 4, a fθ lens 5, and an illuminated surface 6 on which laser light is focused are arranged in this order to construct a fall-correction optical system. In the semiconductor laser light emitting device 1, a laser chip 8 is supported by a package 7.

Laser light emitted from the laser chip 8 is converted to approximately-parallel light by the collimator lens 2, and the laser light is then deflected by the deflector 4 and focused on the illuminated surface 6 by the fθ lens in the meridional cross-sectional plane. In the sagittal cross-sectional plane, the approximately-parallel light is once condensed onto a reflection surface of the polygonal mirror 4 by the cylindrical lens 3, and then focused on the illuminated surface 6 by the fθ lens.

Figure 3:
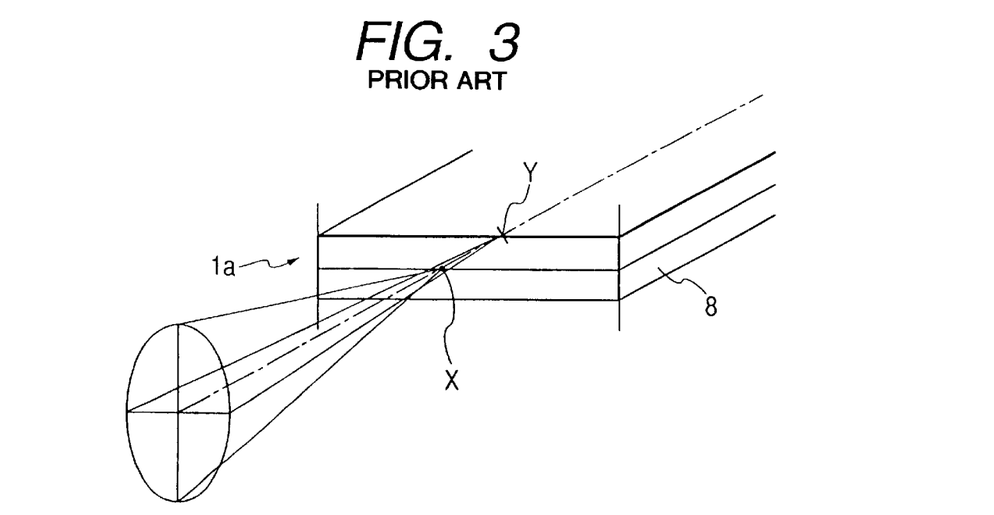
FIG. 3 is a perspective view illustrating a laser chip.

FIG. 3 is a perspective view of the laser chip 8. In the semiconductor laser light emitting device 1, laser light emitted from a junction plane 1a of its active layer generally has a diverging characteristic, so that focus positions in directions perpendicular and horizontal to the junction surface 1a are apparently different from each other. That is, those focus positions in the perpendicular and horizontal directions are X and Y, respectively. A distance between the focus positions X and Y is called an astigmatism.

The astigmatism varies among individual semiconductor laser light emitting devices 1. Therefore, initially the collimator lens 2 is finely adjusted in a direction of its optical axis such that the best focusing can be obtained on the illuminated surface 6 in the meridional cross-sectional plane. Thereupon, the focal point of the collimator lens 2 coincides with the focus position in the direction horizontal to the junction plane 1a of the device 1, and the laser light after transmitted through the collimator lens 2 is converted to parallel light.

On the other hand, in the sagittal cross-sectional plane of FIG. 2, laser light emitted from the focus position in the direction perpendicular to the junction plane 1a is converted to a slightly-divergent light beam by the collimator lens 2 and converted to converging light by the cylindrical lens 3. At this time, the focus position on the illuminated surface 6 is adjusted by finely adjusting the cylindrical lens 3 in the direction of the optical axis.

Thus, manufacturing variations of focal lengths of the collimator lens 2, cylindrical lens 3 and fθ lens 5 together with the astigmatism of the semiconductor laser light emitting device 1 are absorbed, and the overall focus adjustment can hence be effected.

Figure 4:
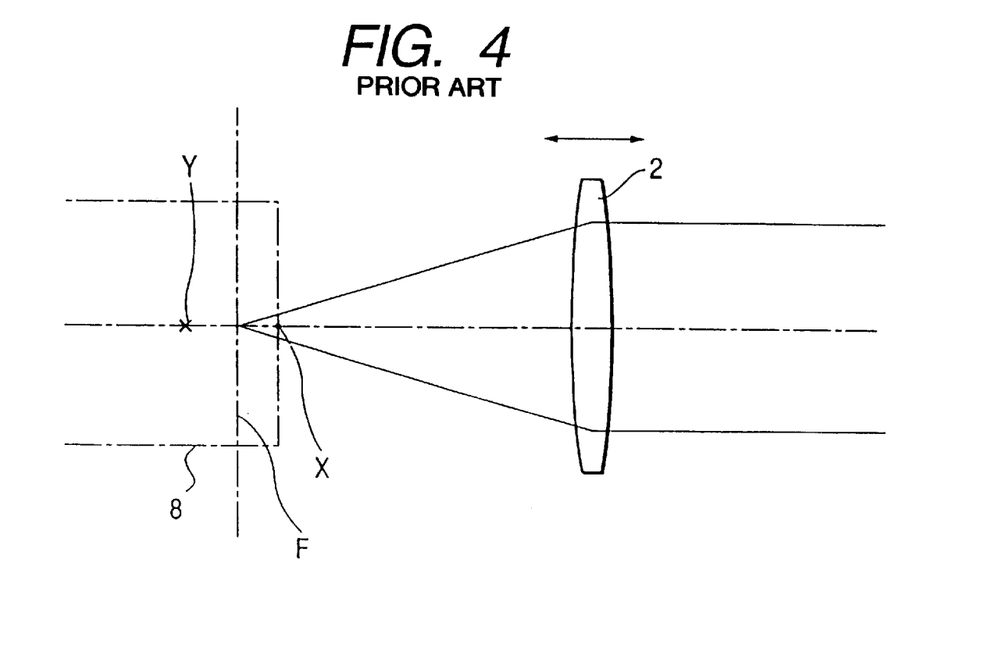
FIG. 4 is a plan view illustrating the focus adjustment of another conventional laser scanning optical system.

FIG. 4 illustrates the structure of another conventional example. The package 7 is omitted therein. A laser chip 8 in the semiconductor laser light emitting device 1 has focus positions X and Y in directions perpendicular and horizontal to the junction plane 1a, and a collimator lens 2 is positioned on the optical path.

Laser light emitted from the laser chip 8 is converted to parallel light by the collimator lens 2. Since the semiconductor laser light emitting device 1 has the astigmatism, the collimator lens 2 is adjusted along the optical axis such that a focal plane F of the collimator lens 2 is positioned at a middle point between the focus positions X and Y of the device 1.

Where the semiconductor laser light emitting device 1 is a single-beam laser light emitting device as in the above-discussed conventional example, the focus adjustment can be readily performed.

However, where the semiconductor laser light emitting device 1 is a multi-beam laser light emitting device, the focus adjustment cannot be executed to the full. This problem will be described with reference to FIG. 5.

Figure 5:
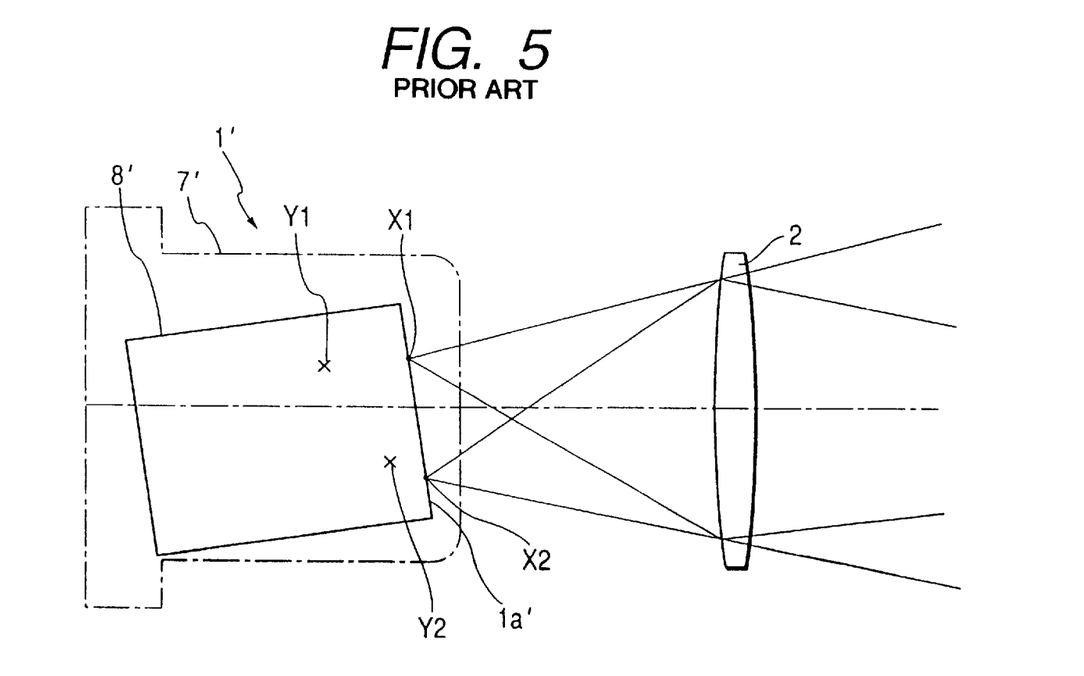
FIG. 5 is a view illustrating the structure of a multi-beam laser light source.

FIG. 5 illustrates the structure of a multi-beam semiconductor laser light emitting device 11. In the multi-beam semiconductor laser light emitting device 1', a laser chip 8' is slantingly supported. Focus positions of the first laser light with respect to divergences in directions perpendicular and horizontal to a junction plane 1a' are points X1 and Y1, respectively, while those focus positions of the second laser light are points X2 and Y2, respectively.

Thus, there is a case where the astigmatism is different between the focus positions (X1 and Y1) of the first laser light and the focus positions (X2 and Y2) of the second laser light. Further, a positional variation of the laser chip 8' relative to the package 7' inevitably occurs within the manufacturing error. Hence, each light emission point is likely to deviate in the direction of the optical axis. Therefore, it is difficult to fully execute the focus adjustment solely by the positional adjustment of the collimator lens 2.

SUMMARY OF THE INVENTION

An object of the present invention is to solve the above problem and provide a laser light source for emitting a plurality of laser light beams whose focus adjustments are made with high precision.

Another object of the present invention is to provide a focus adjustment apparatus for a laser light source for emitting a plurality of laser light beams, which can perform focus adjustments of the laser light beams with high precision.

Still another object of the present invention is to provide a scanning optical system which includes a laser light source for emitting a plurality of laser light beams and has an excellent optical characteristic by using the laser light source for emitting a plurality of laser light beams whose focus adjustments are made with high precision.

The laser light source of the present invention for achieving the above object includes a laser light emitting device for emitting a plurality of laser light beams, a condenser lens for condensing the laser light beams, an interval adjusting unit for adjusting the interval between the laser light emitting device and the condenser lens, and a rotary adjustment unit for adjusting the laser light emitting device around a rotary axis perpendicular to the optical axis of the condenser lens, which rotary axis is positioned near light emission points of the laser light emitting device.

The focus adjusting method for a laser light source of the present invention for achieving the above object includes a step of disposing a laser light emitting device for emitting a plurality of laser light beams, a condenser lens for condensing the laser light beams, and a support member for supporting the laser light emitting device, a step of adjusting the interval between the laser light emitting device and the condenser lens, a step of adjusting the laser light emitting device around a rotary axis perpendicular to the optical axis of the condenser lens, and a step of filling a space between the laser light emitting device and the support member with a setting agent to fix the laser light emitting device to the support member, after the adjustment of the interval and the rotary adjustment.

The scanning optical system with a laser light source of the present invention for achieving the above object includes a laser light emitting device for emitting a plurality of laser light beams, a deflector for deflecting the laser light beams, a condenser unit for condensing the laser light beams onto the deflector, a focusing unit for focusing the laser light beams deflected by the deflector, a focus adjusting unit for performing focus adjustments in main and auxiliary scan cross sections independently from each other, and a rotary adjustment unit for adjusting the laser light emitting device around a rotary axis perpendicular to the optical axis of the condenser lens, which rotary axis is positioned near light emission points of the laser light emitting device.

DETAILED DESCRIPTION OF THE PREFERRED EMBODIMENTS

The present invention will be described using embodiments illustrated in FIGS. 6 and 7.

Figure 6:
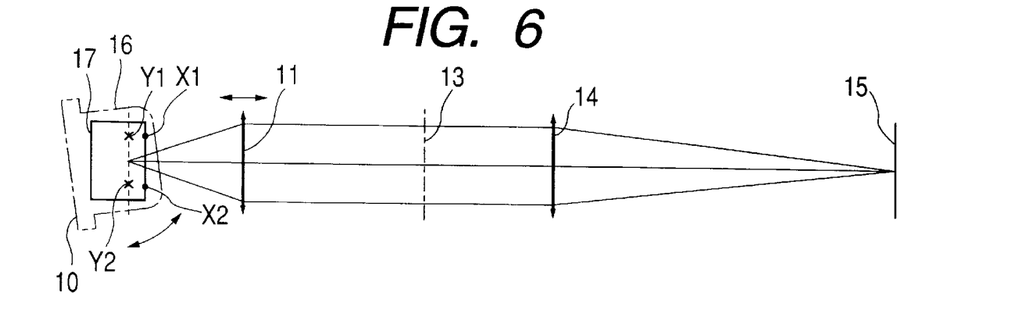
FIG. 6 is a view illustrating the structure in a main scan direction of a first embodiment of a laser scanning optical system according to the present invention.
Figure 7:
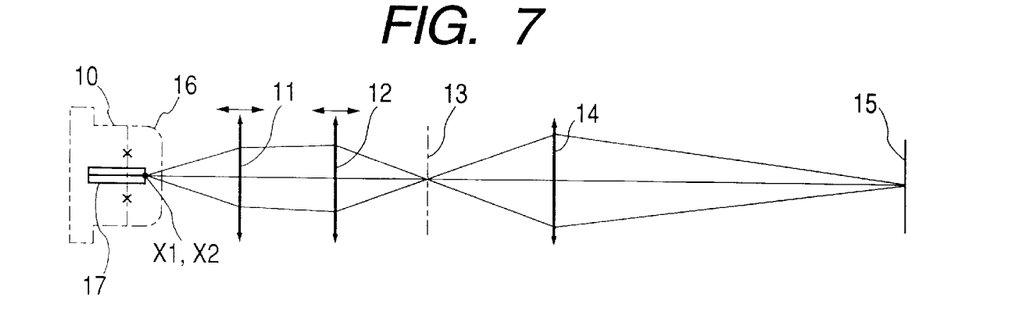
FIG. 7 is a view illustrating the structure in an auxiliary scan direction of the first embodiment.

FIG. 6 illustrates the cross-sectional structure of a laser scanning optical system of a first embodiment of the present invention in a meridional cross section, and FIG. 7 illustrates the cross-sectional structure thereof taken along a sagittal cross section containing an optical axis and perpendicular to the meridional cross section. Such a laser optical system can be used in a laser printer, a laser facsimile or the like.

In the laser scanning optical system, a semiconductor laser light emitting device 10 for emitting plural beams, a collimator lens 11, a cylindrical lens 12, a polygonal mirror 13, a fθ lens 14, and an illuminated surface 15 are arranged in this order to construct a fall-correction optical system. The semiconductor laser light emitting device 10 is supported by a support member such that the rotary adjustment of the device 10 in directions indicated by arrows (around an axis perpendicular to the optical axis) can be performed. It is probable due to the manufacturing error that the laser chip 17 is positioned in a package 16 slanting relative to each other by a minute angle as illustrated in FIG. 6. A photosensitive drum is disposed as a recording medium at the illuminated surface 15.

Laser light emitted from the laser chip 17 is converted to approximately-parallel light by the collimator lens 11, and the laser light is then deflected by the polygonal mirror 13 and focused on the illuminated surface 15 of the photosensitive drum by the fθ lens 14 in the meridional cross-sectional plane of FIG. 6. In the sagittal cross-sectional plane of FIG. 7, the approximately-parallel light is once condensed near the polygonal mirror 13 by the cylindrical lens 12 and then focused on the illuminated surface 15 of the photosensitive drum by the fθ lens 14. The cylindrical lens 12 is omitted in the structure in the meridional cross-sectional plane since the lens 12 has a refracting power only in the sagittal cross-sectional plane.

Figure 8:
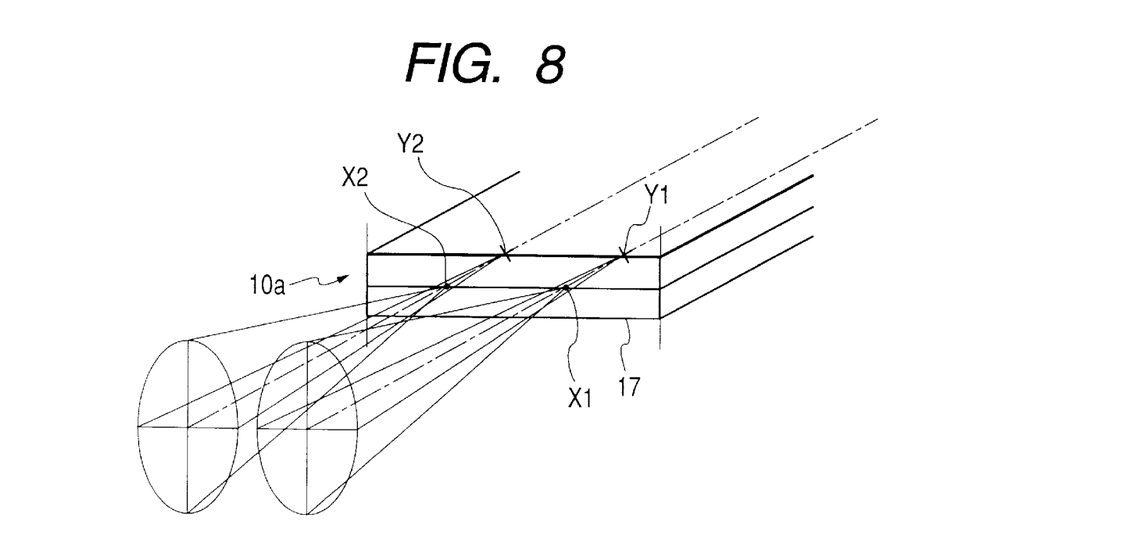
FIG. 8 is a perspective view illustrating a laser chip for emitting a plurality of laser light beams.

FIG. 8 is a perspective view of the laser chip 17. In the multi-beam semiconductor laser light source, first and second laser light beams with diverging characteristics as illustrated in FIG. 8 are generally emitted from a junction plane 10a of the laser chip 17.

Therefore, focus positions of each laser light in directions perpendicular and horizontal to the junction surface 10a are apparently different from each other. That is, the focus positions in the direction perpendicular to the junction plane 10a are X1 and X2, and those in the horizontal direction are Y1 and Y2. Distances between the points X1 and Y1 and between the points X2 and Y2 are astigmatisms, respectively. The astigmatism is generally in a range from several microns to several tens microns, and there may be a case where astigmatisms of the first and second laser light beams are different from each other.

The astigmatism varies among individual semiconductor laser light emitting devices 10. Therefore, the best focus adjustment is made as follows. Initially, attention is paid to the first laser light, and the collimator lens 11 is finely adjusted in the direction of its optical axis to adjust the interval between the semiconductor laser light emitting device 10 and the collimator lens 11 such that the best focusing can be gained on the illuminated surface 15 in the meridional cross-sectional plane of FIG. 6. Thereupon, the focal point of the collimator lens 11 coincides with the focus position Y1 in the direction horizontal to the junction plane 10a of the device 10, and the laser light after transmitted through the collimator lens 11 is converted to parallel light.

Then, attention is paid to the second laser light, and the semiconductor laser light emitting device 10 is adjusted around an axis perpendicular to the optical axis such that the best focus can be attained on the illuminated surface 15 in the meridional cross-sectional plane. After the fine adjustment of the collimator lens 11 and the rotary fine adjustment of the semiconductor laser light emitting device 10 are repeated a plurality of times, the best focus conditions of the first and second laser light beams can be achieved in the meridional cross-sectional plane.

At this point, laser light beams emitted from the focus positions X1 and X2 in the direction perpendicular to the junction plane 10a are converted to slightly-divergent light beams by the collimator lens 11 and converted to converging light by the cylindrical lens 12, in the sagittal cross-sectional plane, as illustrated in FIG. 7. Therefore, the focus position of the laser light on the illuminated surface 15 is adjusted by finely adjusting the cylindrical lens 12 in the direction of the optical axis to adjust the distance between the device 10 and the cylindrical lens 12, in the sagittal cross-sectional plane.

Thus, manufacturing variations of focal lengths of the collimator lens 11, cylindrical lens 12, fθ lens 14 and the like together with the astigmatism of the semiconductor laser light emitting device 10 and mounting errors of the laser chip 17 and package 16 are absorbed, and the overall focus adjustment can hence be effected. Further, when the astigmatisms of the first and second laser light beams are different from each other, the balance between focusing of the first and second laser light beams in cross-sectional planes of the main and auxiliary scans can be appropriately effected by further performing the rotary fine adjustment of the semiconductor laser light emitting device 10. Thus, the collimator lens 11 and the cylindrical lens 12 are supported such that these lenses can be independently adjusted in the direction of the optical axis. Thereby, the focus adjustments in the cross-sectional planes of the main and auxiliary scans can be independently performed.

When the rotary axis of the rotary adjustment is positioned near the light emission points of the semiconductor laser light emitting device 10, the light emission points would not deviate far away from the optical axis during the rotary adjustment. Thus, the focus point of the laser light on the illuminated surface 15 would not largely deviate, so that observations can be readily performed.

Figure 9:
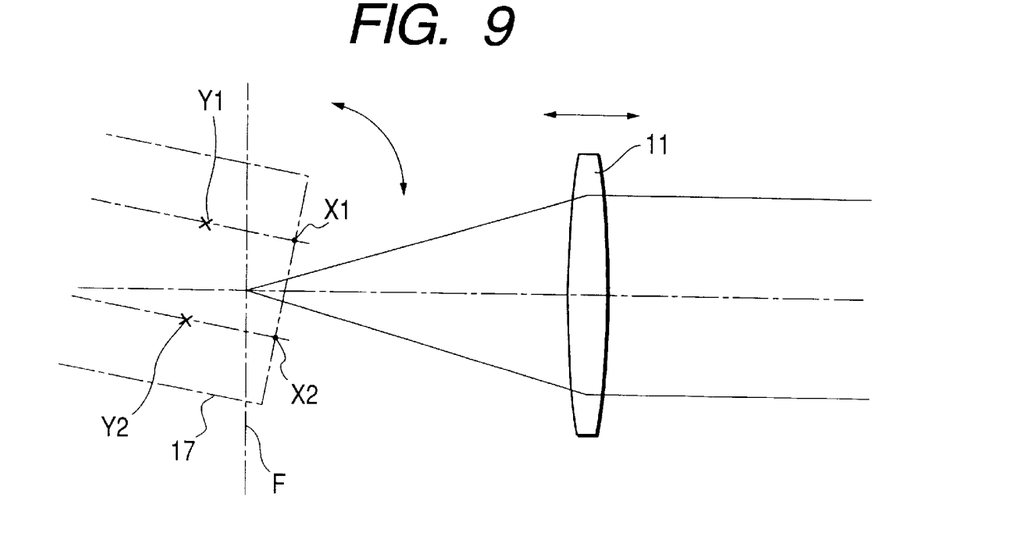
FIG. 9 is a plan view illustrating a second embodiment.

FIG. 9 is a plan view of a second embodiment. The focus positions of the first laser light from a laser chip 17 are points X1 and Y1 with respect to divergences perpendicular and horizontal to a junction plane 10a, while the focus positions of the second laser light are points X2 and Y2 with respect to divergences perpendicular and horizontal to the junction plane 10a. The focal plane of a collimator lens 11 lies at F.

The rotary adjustment of the laser chip 17 about an axis perpendicular to the optical axis and the fine adjustment of the collimator lens 11 in the direction of the optical axis are executed by an adjusting unit (not shown). The adjustments are pursued such that middle points between the points X1 and Y1 and between the points X2 and Y2 lie on the focal plane F. The rotary axis of the rotary adjustment is positioned near the light emission point of each laser light such that the distance between the optical axis and each light emission point is not varied largely.

Figure 10:
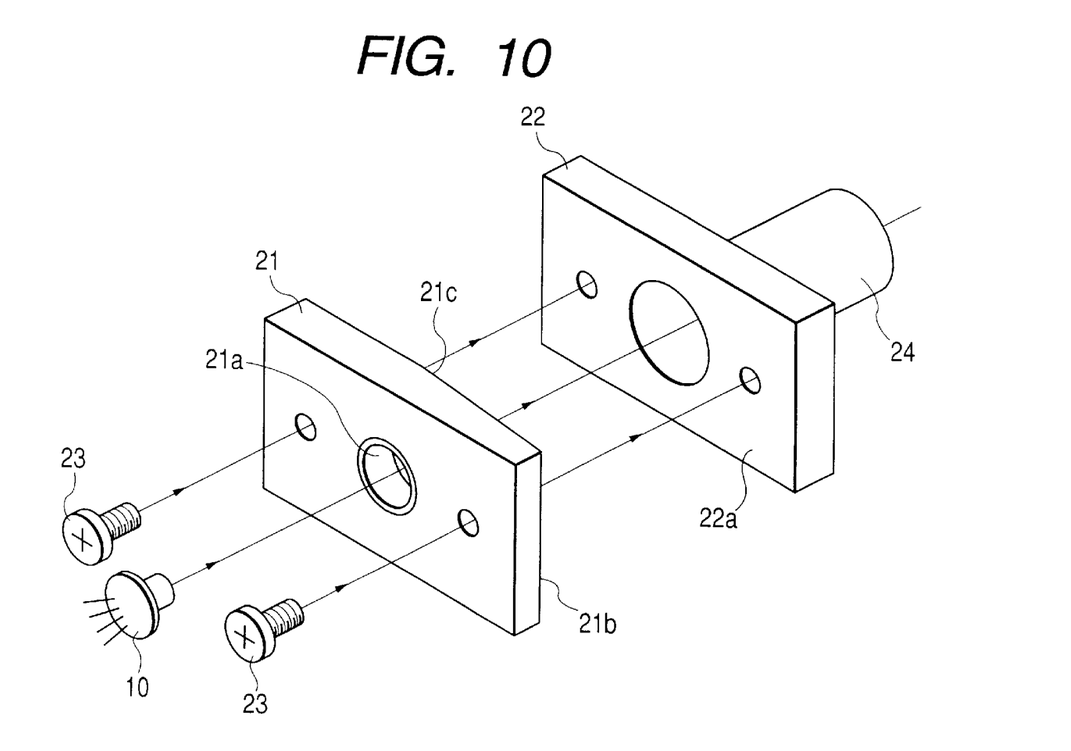
FIG. 10 is a perspective view illustrating a third embodiment.

FIG. 10 is a perspective view of a third embodiment. A laser light emitting device 10 is force-fitted into a hole 21a of a first holder 21, and the first holder 21 is fixed to a second holder 22 by screws 23. A barrel portion 24 is mounted to the second holder 22, and a collimator lens (not shown) is disposed within the barrel portion 24. The collimator lens can be finely adjusted in the direction of the optical axis.

A slant portion is formed over about a half of a bottom surface 21a of the first holder 21, and a boundary line 21c of the slant portion extends in up and down directions. The optical axis intersects the boundary line at its central point. Further, the thickness of the first holder 21 is set and the surfaces 21b and 22a of the first and second holders 21 and 22 are opposed and connected by two screws 23, such that the light emission point of the force-fitted laser light emitting device 10 on the chip lies near the surface 21b.

In the above structure, the first holder 21 can be rotated relatively to the second holder 22 with the boundary line 21c as a supporting point, by tightening or slackening the screws 23. Thus, the rotary adjustment of the laser light emitting device 10 about the axis perpendicular to the optical axis can be executed, and the rotary axis can be positioned near the light emission point of the laser light.

Figure 11:
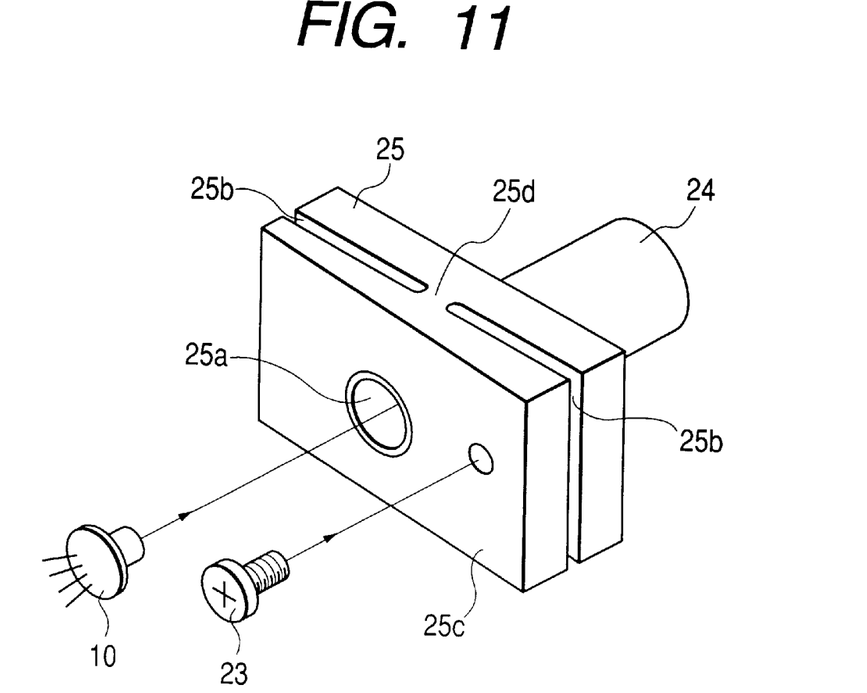
FIG. 11 is a perspective view illustrating a a fourth embodiment.

FIG. 11 is a perspective view of a fourth embodiment. A laser light emitting device 10 is fixed to a holder 25 by a screw 23. Thicknesses of the holder 25 differ between right and left portions thereof. The holder 25 has a hole 25a, into which the laser light emitting device 10 is to be force-fitted, and slit portions 25b slitting perpendicularly to the hole 25a. A barrel portion 24 is mounted to a bottom side of the holder 25 which is an opposite side to a force-fit surface 25c of the laser light emitting device 10. A collimator lens (not shown) is disposed within the barrel portion 24. The collimator lens can be finely adjusted in the direction of the optical axis.

The slit portions 25b are respectively formed from right and left sides of the holder 25, and a connector portion 25d is formed in its central portion. The force-fit surface 25c of the holder 25 is inclined to the optical axis, so that the hole 25a and the force-fitted laser light emitting device 10 are also inclined to the optical axis.

In the above structure, when the screw 23 is tightened, the laser light emitting device 10 goes to a position parallel to the optical axis and slants toward an opposite direction. Thus, the device 10 can be adjusted around the axis perpendicular to the optical axis.

Figure 12:
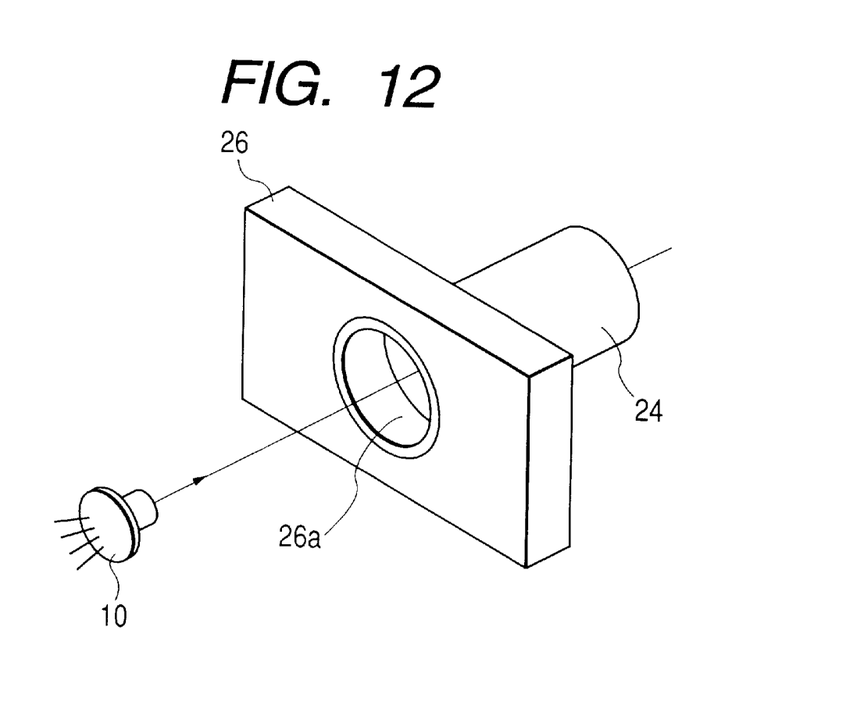
FIG. 12 is a perspective view illustrating a fifth embodiment.

FIG. 12 is a perspective view of a fifth embodiment. A laser light emitting device 10 is fitted in a holder 26. The holder 26 has a hole 26a whose diameter is a little larger than the diameter of the laser light emitting device 10, and a barrel portion 24. A collimator lens (not shown) is disposed within the barrel portion 24.

The laser light emitting device 10 is held by a special jig, and is fitted in the hole 26a of the holder 26. The laser light emitting device 10 is finely adjusted in the direction of the optical axis and adjusted around the axis perpendicular to the optical axis to pursue its desired focus adjustment, by using that special jig. Thereafter, a space between the laser light emitting device 10 and the hole 26a is filled with, for example, ultraviolet-rays setting resin to fix the device 10. The adjustment of the laser light emitting device 10 is then completed by removing the special jig.

As described in the foregoing, in the laser light source of the present invention, the laser light emitting device is adjusted around the axis perpendicular to the optical axis of the condenser lens by using a rotary adjustment unit having its rotary axis near the light emission points of the laser light emitting device for emitting plural laser light beams, and hence focus deviations due to the positional deviation between the laser light emitting device and the package and the difference in the astigmatism between the beams can be reduced.

Further, in the focus adjusting method of a laser light source of the present invention, the distance between the laser light emitting device for emitting plural laser light beams and the condenser lens is adjusted and the laser light emitting device is adjusted around the axis perpendicular to the optical axis of the condenser lens, so that the focus adjustment of the laser light source for emitting plural laser light beams can be performed.

In the scanning optical system including a laser light source of the present invention, the laser light source for emitting plural laser light beams, whose focus adjustments are made with high precision, is provided, so that high performances, such as reduction of the spot diameter of laser light, can be attained and an increase in the number of parts can be prevented.

What is claimed is:

1. A laser light source comprising:

a laser light emitting device for emitting a plurality of laser light beams;

a condenser lens for condensing the laser light beams;

interval adjusting means for adjusting an interval between said laser light emitting device and said condenser lens; and rotary adjustment means for adjusting said laser light emitting device around a rotary axis perpendicular to an optical axis of said condenser lens, the rotary axis of said rotary adjustment means being positioned near light emission points of said laser light emitting device.

2. A laser light source according to claim 1, said condenser lens comprising a first lens and a second lens.

3. A laser light source according to claim 2, said first lens comprising a collimator lens and said second lens comprising a cylindrical lens.

4. A laser light source according to claim 2, said first and second lenses being supported independently adjustable in a direction of the optical axis.

5. A scanning optical system comprising:

a laser light emitting device for emitting a plurality of laser light beams;

a deflector for deflecting the laser light beams;

a condenser lens for condensing the laser light beams;

interval adjusting means for adjusting an interval between said laser light emitting device and said condenser lens; and rotary adjustment means for adjusting said laser light emitting device around a rotary axis perpendicular to an optical axis of said condenser lens, the rotary axis of said rotary adjustment means being positioned near light emission points of said laser light emitting device.

6. A scanning optical system according to claim 5, said condenser lens comprising a first lens and a second lens.

7. A scanning optical system according to claim 6, said first lens comprising a collimator lens and said second lens comprising a cylindrical lens.

8. A scanning optical system according to claim 6, said first and second lenses being supported independently adjustable in a direction of the optical axis.

9. An image forming apparatus comprising:

a laser light emitting device for emitting a plurality of laser light beams;

a deflector for deflecting the laser light beams;

a recording medium, the laser light beams deflected by said deflector being illuminated on said recording medium;

a condenser lens for condensing the laser light beams;

interval adjusting means for adjusting an interval between said laser light emitting device and said condenser lens; and rotary adjustment means for adjusting said laser light emitting device around a rotary axis perpendicular to an optical axis of said condenser lens, the rotary axis of said rotary adjustment being positioned near light emission points of said laser light emitting device.

10. An image forming apparatus according to claim 9, said condenser lens comprising a first lens and a second lens.

11. An image forming apparatus according to claim 10, said first lens comprising a collimator lens and said second lens comprising a cylindrical lens.

12. An image forming apparatus according to claim 10, said first and second lenses being supported independently adjustable in a direction of the optical axis.

* * * * *

UNITED STATES PATENT AND TRADEMARK OFFICE
CERTIFICATE OF CORRECTION

PATENT NO.    : 6,081,364
DATED         : June 27, 2000
INVENTOR(S)   : Kazumi Kimura It is certified that error appears in the above-identified patent and that said Letters Patent is hereby corrected as shown below:

Title page, Item [54], and Column 1, line 1,
"LASER LIGHT SOURCE FOR EMITTING A PLURALITY OF LASER BEAMS, METHOD ADJUSTING FOCUSING OF THE LASER LIGHT SOURCE, AND SCANNING OPTICAL SYSTEM" should read
-- LASER LIGHT SOURCE FOR EMITTING A PLURALITY OF LASER BEAMS, METHOD FOR ADJUSTING FOCUSING ON THE LASER LIGHT SOURCE, AND SCANNING OPTICAL SYSTEM --.

Column 1,
Line 53, "transmitted" should read -- being transmitted --.

Column 2,
Line 23, "device 11." should read -- device 1'. --.

Column 3,
Line 51, "a a fourth" should read -- a fourth --.

Column 4,
Line 10, "probable" should read -- probably --.

Signed and Sealed this

Twenty-third Day of July, 2002

Attest:

JAMES E. ROGAN
Attesting Officer     Director of the United States Patent and Trademark Office